United States Patent [19]
Beck et al.

[11] Patent Number: 5,493,723
[45] Date of Patent: Feb. 20, 1996

[54] PROCESSOR WITH IN-SYSTEM EMULATION CIRCUITRY WHICH USES THE SAME GROUP OF TERMINALS TO OUTPUT PROGRAM COUNTER BITS

[75] Inventors: Motti Beck, Tel Aviv; Ran Talmudi, Raanana, both of Israel; Sorin Iacobovici, San Jose, Calif.

[73] Assignee: National Semiconductor Corporation, Santa Clara, Calif.

[21] Appl. No.: 330,222

[22] Filed: Oct. 27, 1994

Related U.S. Application Data

[63] Continuation of Ser. No. 110,325, Aug. 20, 1993, abandoned, which is a continuation of Ser. No. 609,814, Nov. 6, 1990, abandoned.

[51] Int. Cl.$^6$ ............................. G06F 11/30; G06F 13/00
[52] U.S. Cl. .................. 395/500; 364/221.1; 364/221.6; 364/232.3; 364/267.4; 364/DIG. 1
[58] Field of Search ............................... 395/375, 800, 395/500, 775, 725; 364/DIG. 1, DIG. 2; 371/16.2, 15, 68.3

[56] References Cited

U.S. PATENT DOCUMENTS

| | | | |
|---|---|---|---|
| 4,144,562 | 3/1979 | Cooper | 364/200 |
| 4,267,581 | 6/1981 | Kobayashi et al. | 364/900 |
| 4,308,581 | 12/1981 | Raghunathan | 364/200 |
| 4,443,864 | 4/1984 | McElroy | 364/900 |
| 4,460,972 | 7/1984 | Homan et al. | 364/900 |
| 4,470,113 | 9/1984 | Oura | 395/325 |
| 4,633,437 | 12/1986 | Mothersole et al. | 364/900 |
| 4,670,838 | 6/1987 | Kawata | 395/375 |
| 4,674,089 | 6/1987 | Poret et al. | 395/500 |
| 4,727,514 | 2/1988 | Bhuva et al. | 365/104 |
| 4,780,819 | 10/1988 | Kashiwagi | 395/500 |
| 4,813,009 | 3/1989 | Tallman | 364/900 |
| 4,823,307 | 4/1989 | Melgara et al. | 364/900 |
| 4,833,620 | 5/1989 | Takahashi | 364/490 |
| 4,841,434 | 6/1989 | Mathewes, Jr. et al. | 364/200 |
| 4,872,167 | 10/1989 | Maezawa et al. | 371/19 |
| 4,881,228 | 11/1989 | Shouda | 364/900 |
| 4,924,382 | 5/1990 | Shouda | 395/700 |
| 4,969,087 | 11/1990 | Tanagawa et al. | 395/800 |
| 5,021,948 | 7/1991 | Nakayama et al. | 364/200 |
| 5,021,996 | 6/1991 | Watanabe | 395/800 |
| 5,088,027 | 12/1992 | Tanagawa et al. | 395/575 |
| 5,101,498 | 3/1992 | Ehlig et al. | 395/800 |
| 5,132,971 | 7/1992 | Oguma et al. | 371/16.2 |
| 5,151,881 | 9/1992 | Kajigaya et al. | 365/233 |
| 5,262,990 | 11/1993 | Mills et al. | 365/189.02 |
| 5,289,587 | 2/1994 | Razban | 395/375 |

*Primary Examiner*—Meng-Ai An
*Attorney, Agent, or Firm*—Limbach & Limbach

[57] ABSTRACT

A processor emulation system for testing processor operation. First and second identical microprocessors are used together with a target system which includes the main memory. One microprocessor performs an in-system emulation (ISE) function by operating in lock step with the second processor which functions as the master processor. A mode control signal is used to switch the microprocessors between a normal operating mode and an ISE mode. Normal microprocessor signals are outputted on predetermined terminals for the processor in the normal operating mode and the parallel contents of the processor program counter are outputted on the same predetermined terminals when the microprocessor is in the ISE mode. The master processor provides output signals to the target system, with the ISE processor and the master processor both receiving signals from the target system. Operation of the master processor can be ascertained by monitoring the program counter output of the ISE processor.

10 Claims, 3 Drawing Sheets

PROCESSOR WITH IN-SYSTEM EMULATION CIRCUITRY WHICH USES THE SAME GROUP OF TERMINALS TO OUTPUT PROGRAM COUNTER BITS

This is a continuation of application Ser. No. 08/110,325 filed on Aug. 20, 1993 now abandoned, which was a continuation application of application Ser. No. 07/609,814 filed on Nov. 6, 1990 now abandoned.

BACKGROUND OF THE INVENTION

1. Field of the Invention

The present invention relates generally to processors and, in particular, to microprocessors having circuitry which permits the microprocessor to operate in both a normal and in an in-system emulation (ISE) mode.

2. Background Art

When a microprocessor-based system is designed, there are typically "bugs" which occur only infrequently and only at full operating frequencies. Microprocessors system designers commonly rely on in-system emulation (ISE) techniques to monitor a working system and trace information used to diagnose "bugs." ISE techniques utilize a master processor which is part of the system being tested together with an ISE microprocessor which emulates the master processor. This is typically accomplished by operating the two microprocessors in lock-step synchronization, so that both processor execute the same code.

One of the most important values to trace is the Program Counter (PC) value of the master processor, which corresponds to the flow of control in the program. The PC value of the ISE processor will match that of the master processor since the two processes are operating in lock-step.

In early generation microprocessors, the PC value was available on normal microprocessor signal pins (terminals) for each instruction fetch. More recent microprocessors integrate cache memory on-chip, so that the majority of the instruction fetches are not visible off-chip. One more recent microprocessor provides the PC value on dedicated pins to support ISE capability. However, the PC value can exceed thirty-two bits, which are read out sixteen bits at a time in two consecutive clock cycles, thereby requiring sixteen dedicated pins. In the event a reduced instruction set processor (RISC) is used, all of the bits must be read out in one clock cycle thus requiring that all of the bits be read out in parallel. Accordingly, a large number of pins will be required. Such additional pins are costly and serve no value in a normal operation of the system.

The present invention overcomes the above-noted shortcomings of conventional microprocessors. The disclosed microprocessor permits the PC value to be read and displayed in ISE applications without resorting to the use of dedicated pins. This and other advantages of the present invention will become apparent to those skilled in the art upon a reading of the following Detailed Description of the Invention, together with the drawings.

SUMMARY OF THE INVENTION

A processor emulation system for testing processor operation which includes first and second processors is disclosed. Each of the processors includes a program counter which contains a program counter value comprising a plurality of program counter bits which represent an instruction address which corresponds to a processor instruction currently being executed by the processors. Each of the processors includes a multiplicity of processor terminals which function to provide an interface for signals exchanged between the processor and an environment external to the processor. The processor terminals include a first group of terminals to exclusively output signals from the processor, a second group of terminals which function exclusively to input signals to the processor and a third group of terminals which function to both input signals to the processor and output signals from the processor.

Each of the processors further includes select means for selectively parallel coupling either a first group of processor signals to predetermined ones of the first group of processor terminals or a second group of processor signals to the same predetermined ones of the first group of processor terminals in response to a mode control signal. The second group of processor signals represent at least a majority of the program counter bits.

The mode control signal can be used to produce the at least a majority of program counter bits at the same predetermined ones of the first group of processor terminals when the processor is operating in an in-system emulation mode and can also be used to produce the first group of processor signals at the same predetermined ones of the first group of processor terminals when the processor is operating in a normal operation mode. The processor emulation system further includes a target system which includes at least one input/output device such as a memory and receives target system input signals from one of the first and second processors and produces target system output signals. The first processor is provided with the mode control signal such that the first processor is operating in the in-system emulation mode and the second processor is provided with the mode control signal such that the second processor is operating in the normal operating mode. The output signals of the target system are coupled to terminals included in the second group of terminals of the first and second processors whereby operation of the second processor can be monitored by way of the majority of program counter bits provided at the first group of processor terminals of the first processor.

DETAILED DESCRIPTION OF THE INVENTION

Figure 1:
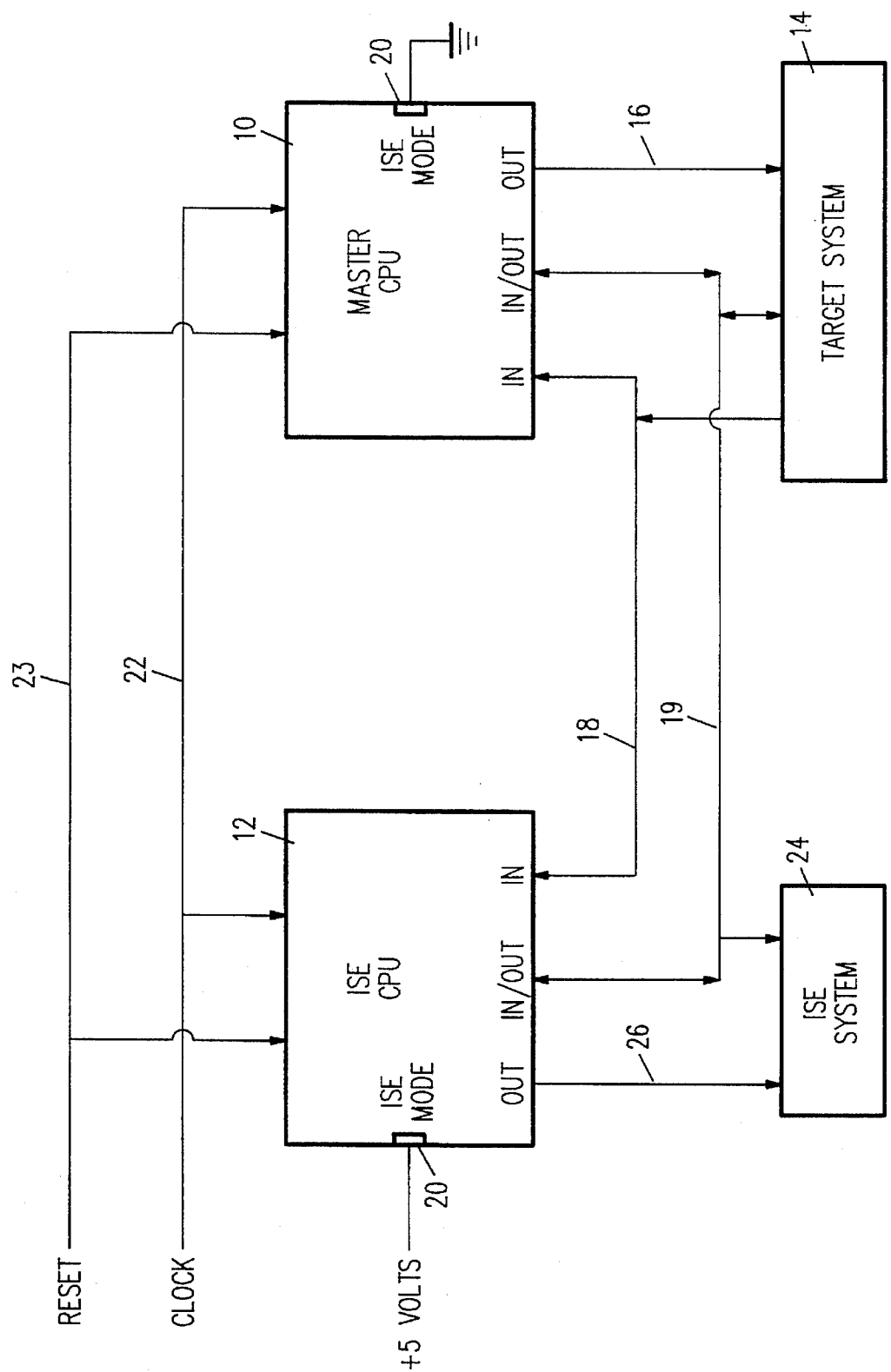
FIG. 1 is a block diagram showing two microprocessors having in-system emulation (ISE) circuitry operating together in lock-step, with one microprocessor functioning as the master and the other functioning as an ISE processor which emulates the master processor.

Referring to FIG. 1, two identical central processing units (CPUs) 10 and 12, such as microprocessors, are configured to perform in-system emulation (ISE). CPU 10, the master CPU, is the working CPU which interfaces with the target system 14. Master CPU 10 is configured to operate as the master during ISE testing by grounding an ISE Mode control pin 20. The target system includes, for example, the main memory and the system I/O.

The master CPU 10 interfaces with the target system 14 by way of CPU outputs represented collectively by line 16. CPU 10 also provides outputs to the target system 14 by outputs which can also function as inputs, which are represented collectively by line 19. Such outputs (lines 16 and 19)

include, for example, the CPU addresses, the bus control input signals and data.

The master CPU 10 also interfaces with the target system 14 by way of CPU inputs, represented collectively by line 18. CPU 10 also receives inputs from the target system on input/output lines 19. Such inputs (lines 18 and 19) include data inputs and bus control inputs.

The ISE CPU 12 also interfaces with the target system 14 by way of CPU input line 18 and input/output line 19. CPU 12 is configured to operate as the ISE CPU during ISE testing by connecting the ISE Mode pin 20 to +5 Volts.

The master CPU 10 and the ISE CPU 12 are clocked by a common clock on line 22 and are reset by a common reset signal on line 23 so that the two processors operate in lock step. The ISE CPU 12 outputs are forwarded to the ISE system block 24 and are collectively represented by line 26. The outputs also include certain ones of the outputs which can also function as inputs, with all of the inputs/outputs being represented by line 19. The ISE CPU 12 outputs (lines 19 and 26) include the thirty most significant bits of the thirty-two bit program counter (PC) value.

Since CPUs 10 and 12 are operating in lock step, they will execute identical code and will respond to identical inputs. Accordingly, the PC value of the two CPUs will be the same so that the ISE CPU 12 PC value will reflect the PC value of the master CPU 10. Accordingly, the PC value on lines 26 and 19 can be used to troubleshoot and debug problems in the master CPU 20 and associated target system 14 in the conventional manner.

Figure 2A:
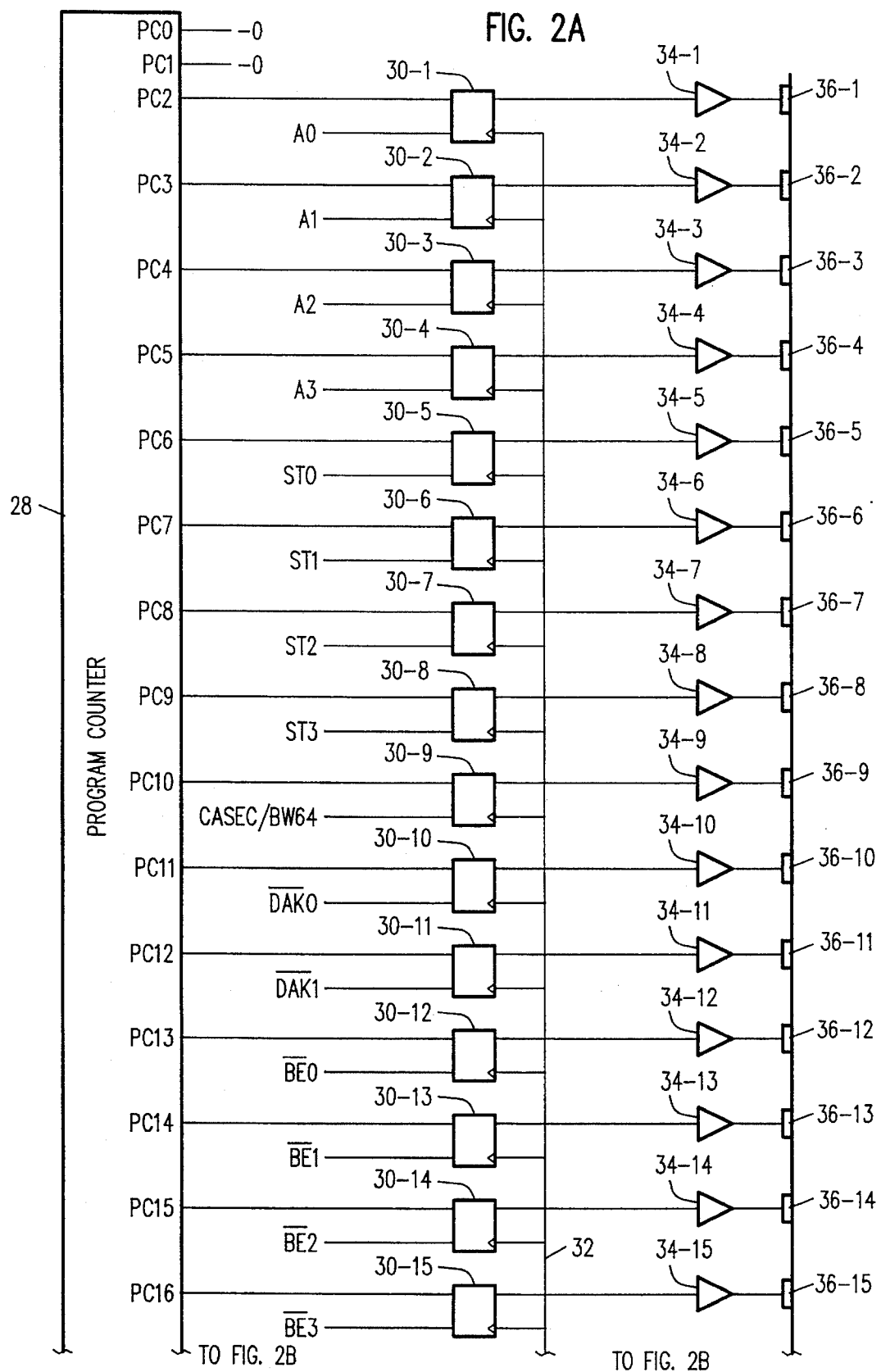
FIGS. 2A and 2B is a circuit diagram of a portion of the microprocessor showing the in-system emulation circuitry.
Figure 2B:
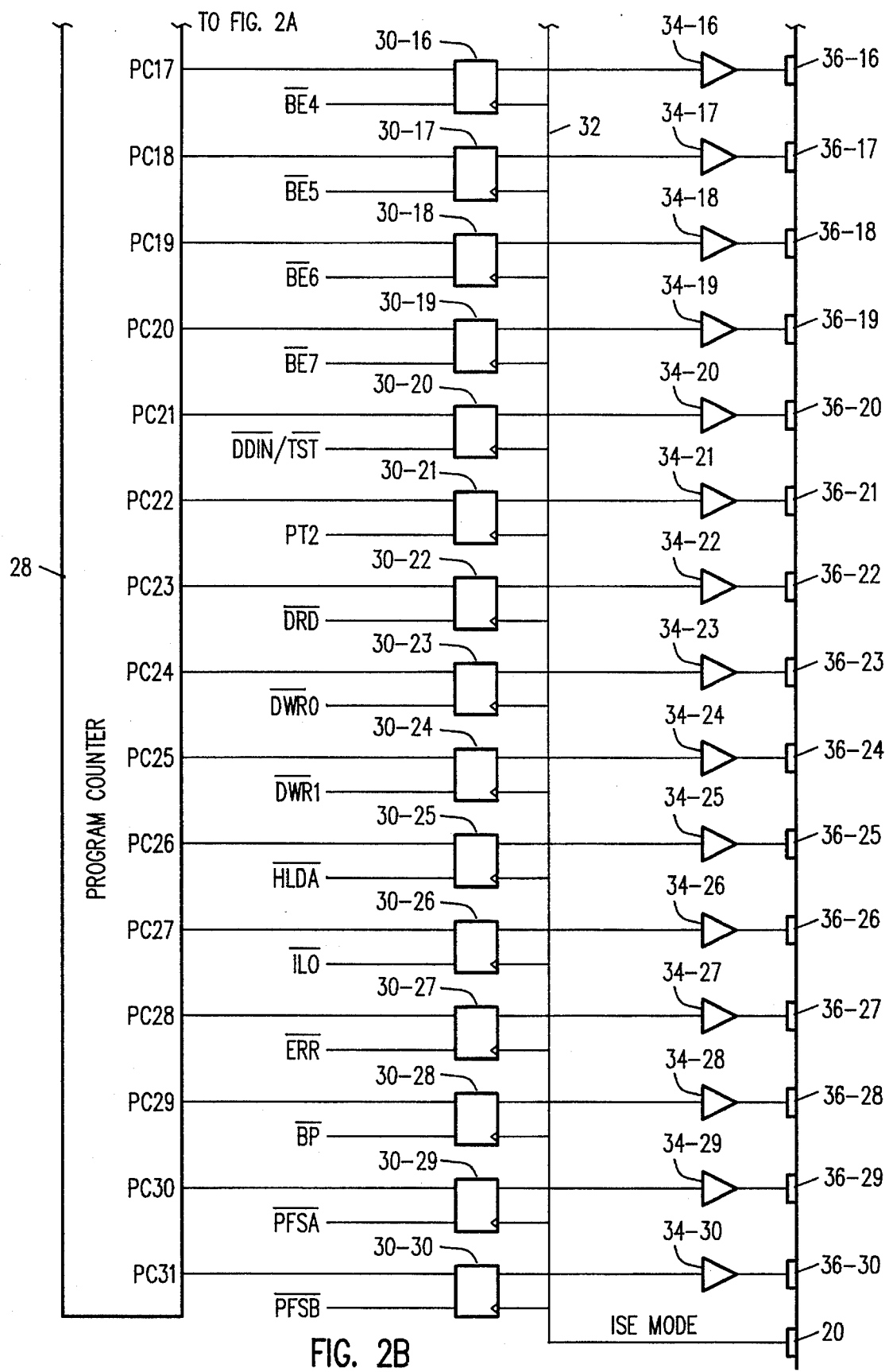

FIGS. 2A and 2B show the ISE mode circuitry utilized in CPUs 10 and 12. As will be explained in greater detail, the mode circuitry selects one of two groups of signals to be internally coupled to thirty of the CPU output pins (terminals) in response to the voltage level applied to the ISE mode control pin 20 of the CPU. If the voltage level at pin 20 is at ground, the selected group of signals are normal CPU outputs so that the CPU can perform the normal CPU operations, such as those performed by master CPU 20. If the pin 20 level is high, the thirty most significant bits of the PC value are coupled to the thirty output pins in parallel, in lieu of the normal outputs.

The CPU program counter, represented by block 28, has thirty-two outputs, PC0 through PC31. However, the two least significant bits, PC0 and PC1, are always a logic 0. These PC bits are not provided to the ISE system 24 when the CPU is switched to the ISE mode.

The ISE mode circuitry includes thirty two-input multiplexers 30-1 through 30-30 which connect a selected one of the two inputs to the multiplexer output in response to a control input. The multiplexer control inputs are all connected to a common line 32 which is connected to the CPU ISE Mode pin 20.

The multiplexers 30-1 through 30-30 each have one input connected to program counter outputs PC2 through PC31, respectively. The remaining input of each multiplexer 30-1 through 30-30 is connected to various microprocessors interface signals, the majority of which are exclusively microprocessor output signals. The output of each multiplexer 30-1 through 30-30 is connected to a buffer circuit 34-1 through 34-30, respectively. The outputs of the buffer circuits 34-1 through 34-30 are, in turn, connected to microprocessor pins (terminals) 36-1 through 36-30, respectively.

Thus, the thirty most significant bits of the thirty-two bit counter (PC) outputs are connected to the multiplexers 30-1 through 30-30. Preferably, at least a majority of the PC outputs are parallel coupled to the microprocessor terminals or pins so that the flow of control in the program being executed can be ascertained by monitoring the pins.

Table 1, below, shows the microprocessor interface signals for pins 36-1 through 36-30 when the microprocessor is switched to the normal mode of operation and to the ISE mode.

TABLE 1

| Pin | Normal Output | ISE Output | Pin | Normal Output | ISE Output |
|---|---|---|---|---|---|
| 36-1 | A0 | PC2 | 36-16 | $\overline{BE4}$ | PC17 |
| 36-2 | A1 | PC3 | 36-17 | $\overline{BE5}$ | PC18 |
| 36-3 | A2 | PC4 | 36-18 | $\overline{BE6}$ | PC19 |
| 36-4 | A3 | PC5 | 36-19 | $\overline{BE7}$ | PC20 |
| 36-5 | ST0 | PC6 | 36-20 | $\overline{DDIN}/\overline{TST}$ | PC21 |
| 36-6 | ST1 | PC7 | 36-21 | $\overline{PT2}$ | PC22 |
| 36-7 | ST2 | PC8 | 36-22 | $\overline{DRD}$ | PC23 |
| 36-8 | ST3 | PC9 | 36-23 | $\overline{DWR0}$ | PC24 |
| 36-9 | $\overline{CASEC}/BWF64$ | PC10 | 36-24 | $\overline{DWR1}$ | PC25 |
| 36-10 | $\overline{DAK0}$ | PC11 | 36-25 | $\overline{HLDA}$ | PC26 |
| 36-11 | $\overline{DAK1}$ | PC12 | 36-26 | $\overline{ILO}$ | PC27 |
| 36-12 | $\overline{BE0}$ | PC13 | 36-27 | $\overline{ERR}$ | PC28 |
| 36-13 | $\overline{BE1}$ | PC14 | 36-28 | $\overline{BP}$ | PC29 |
| 36-14 | $\overline{BE2}$ | PC15 | 36-29 | $\overline{PFSA}$ | PC30 |
| 36-15 | $\overline{BE3}$ | PC16 | 36-30 | $\overline{PFSB}$ | PC31 |

The microprocessor interface pins (terminals) normally function exclusively as outputs (represented by lines 16 and 26 of FIG. 1), exclusively as inputs (represented by line 18 of FIG. 1), or function as both inputs and outputs (represented by line 19 of FIG. 1). With a few exceptions, the pins listed in Table 1 normally function exclusively as microprocessor outputs when operating in the normal mode. Master CPU 10, and not ISE CPU 12, provides outputs to the target system 14. Accordingly, the normal outputs of the ISE CPU 12 are not required for emulation. Instead, the PC values are provided by the ISE CPU.

A very brief description of the Table 1 normal microprocessor outputs will be given, although it is to be understood that these signals are exemplary only. Signals A0 through A3 on pins 36-1 through 36-4 are the four least significant bits of microprocessor address bus. The address bus pins function as both inputs and outputs, therefore these pins should not be activated by the target system 14 when emulation is being performed. Signals ST0 through ST3 comprise bus control status signals indicating the type of bus cycle. These signals also function exclusively as outputs.

The $\overline{CASEC}/BWF$ 64 signal on pin 36-9 functions as an input (BWF 64) which is sampled by the processor during reset to determine the default bus width. The signal also functions as an output ($\overline{CASEC}$) to indicate the section of the on-chip data cache where data is stored. When the pin functions as an input (during reset), it receives the input from the system through a three state buffer. When the pin functions as an output (after reset), the three state buffer is disabled so that the buffer is effectively disconnected.

Signals $\overline{DAK0}$ and $\overline{DAK1}$ on pins 36-10 and 36-11, respectively, are direct memory access (DMA) control signals and are exclusively outputs. $\overline{BE0}$ through $\overline{BE7}$ on pins 36-12 through 36-19, respectively, are bus timing and control signals (bus control byte enable signals) and are exclusively output signals.

$\overline{DDIN}/\overline{TST}$ on pins 36-20 functions as an input ($\overline{TST}$) which is sampled by the processor during reset to determine whether the processor should conduct a self-test. The signal functions as an output ($\overline{DDIN}$) to indicate the direction (read/write) of a data transfer on the data bus requested by the processor. When the pin functions as an input (during reset), it receives the input from the system through a three state buffer. When the pin functions as an output (after reset), the three state buffer is disabled so that the buffer is effectively disconnected.

Signal $\overline{PT2}$ on pin 36-21 is a bus control signal (Possible T2 of the Bus Cycle) which is exclusively an output. Signal $\overline{DRD}$ on pin 36-22 is another data direction signal (read/write) which functions exclusively as an output. Signals $\overline{DWR0}$ and $\overline{DWR1}$ on pins 36-23 and 36-24, respectively, are bus timing and control signals (data write strobes) and both function exclusively as output signals.

Signal $\overline{HLDA}$ on pin 36-25 is a bus access control signal indicating that the processor has released the bus. This signal is exclusively an output signal. Signal $\overline{IL0}$ on pin 36-26 is a bus timing and control signal indicating when interlocked bus cycles have been performed. This signal is also exclusively an output signal. Pin 36-27 carries signal $\overline{ERR}$ which is a special mode signal indicating that a certain type of processor error has occurred. This signal is exclusively an output. Signal $\overline{BP}$ on pin 36-28 is an internal microprocessor information signal indicating that the processor has detected an enabled debug condition. This signal is exclusively an output. Finally, signals $\overline{PFSA}$ and $\overline{PFSB}$ on pins 36-29 and 36-30 are both internal microprocessor signals (program flow status signals) which are exclusively output signals.

As previously noted, pins PC-2 through PC-31 listed in Table 1 are exemplary only. In selecting the PC output pins, it is preferable that the processor data input pins not be used since they are usually needed for emulation.

Thus a processor having in-system emulation circuitry has been disclosed. Although a preferred embodiment has been described in some detail, it is to be understood that changes can be made by those skilled in the art without departing from the spirit and scope of the invention as defined by the appended claims.

We claim:

1. A processor emulation system for testing processor operation, said system comprising:
    first and second processors, each of the processors including a program counter which contains a program counter value comprising a plurality of program counter bits which represent an instruction address which corresponds to a processor instruction currently being executed by the processors, with each of said processors further including
    (a) a multiplicity of processor terminals which function to provide an interface for signals exchanged between the processor and an environment external to the processor, with the processor terminals including a first group of terminals to exclusively output signals from the processor, a second group of terminals which function exclusively to input signals to the processor and a third group of terminals which function to both input signals to the processor and output signals from the processor;
    (b) select means for selectively parallel coupling either a first group of processor signals to predetermined ones of the first group of processor terminals or a second group of processor signals to the same predetermined ones of the first group of processor terminals in response to a mode control signal, with the second group of processor signals representing at least a majority of the program counter bits;
    wherein the mode control signal can be used to produce the at least a majority of program counter bits at the same predetermined ones of the first group of processor terminals when the processor operating in an in-system emulation mode and can also be used to produce the first group of processor signals at the same predetermined ones of the first group of processor terminals when the processor operating in a normal operation mode; and
    said processor emulation system further including
    a target system which includes at least one input/output device and, said target system receives target system input signals from one of the first and second processors and produces target system output signals;
    wherein the first processor is provided with said mode control signal such that the first processor is operating in the in-system emulation mode and the second processor is provided with the mode control signal such that the second processor is operating in the normal operating mode and wherein the output signals of the target system are coupled to terminals included in the second group of terminals of the first and second processors whereby operation of the second processor can be monitored by way of the majority of program counter bits provided at the first group of processor terminals of the first processor.

2. The processor emulation system claim 1 wherein the terminals of the first and second processors include a mode control terminal for receiving the mode control signal.

3. The system of claim 1 wherein the target system input signals are coupled to terminals included in the first group of processor terminals of the second processor.

4. The processor emulation system of claim 1 wherein all of the second group of processor signals are coupled to the same predetermined ones of the processor terminals substantially at the same time.

5. The processor emulation system of claim 4 wherein the terminals of the first and second processors include data input terminals for inputting data to the processor and wherein the same predetermined ones of the processor terminals do not include the data input terminals.

6. A method of testing processor operations utilizing first and second processors and a target system with the first and second processors each including a program counter which contains a program counter value comprising a plurality of program counter bits which represent an instruction address which corresponds to a processor instruction currently being executed by the processors and a multiplicity of processor terminals which function to provide an interface for signals exchanged between the processor and an environment external to the processor, with the processor terminals including a first group of terminals which function to exclusively output signals from the processor, a second group of terminals which function exclusively to input signals to the processor and a third group of terminals which function to both input signals to the processor and output signals from the processor, wherein the processors include a first group of processor signals and a second group of processor signals, the second group of processor signals representing at least a majority of the program counter bits, and wherein the processors each include select means for selectively coupling either the first group of processor signals to predetermined ones of the first group of processor terminals or the second group of processor signals to the same predetermined ones of the first group of processor terminals and the target system including at least one input/output device and said target system receives target system input signals from one of the first and second processors and produces target system output signals, the method comprising the following steps:

generating a mode control signal for switching the processors between a normal operating mode and an in-system emulation mode;

placing the first processor in said in-system emulation mode by coupling the second group of processor signals of the first processor to the first group of terminals of the first processor;

placing the second processor in the normal operating mode by coupling the first group of processor signals of the second processor to the first group of terminals of the second processor: and coupling the output signals of the target system to terminals included in the second group of processor terminals of the first and second processors;

whereby operation of the second processor can be evaluated by monitoring the program counter bits produced at the first group of processor terminals of the first processor.

7. The method of claim 6 wherein the first and second processor terminals include a mode control terminal for receiving the mode control signal.

8. The method of claim 6 wherein the step of placing the first processor in said in-system emulation mode by coupling the second group of processor signals to the first group of processor terminals includes coupling the second group of processor signals substantially at the same time.

9. The method of claim 8 wherein the processor terminals include data input terminals for inputting data to the processor and wherein the same predetermined terminals do not include the data input terminals.

10. The method of claim 6 further including the step of coupling the input signals of the target system to second processor terminals included in the first group of processor terminals.

* * * * *

UNITED STATES PATENT AND TRADEMARK OFFICE
CERTIFICATE OF CORRECTION

PATENT NO. : 5,493,723
DATED : February 20, 1996
INVENTOR(S) : Motti Beck, et al It is certified that error appears in the above-indentified patent and that said Letters Patent is hereby corrected as shown below:

In Column 6, line 2, before "operating", please insert --is--.

In Column 6, line 6, before "operating", please insert --is--.

Signed and Sealed this

Twenty-eighth Day of May, 1996

Attest:

BRUCE LEHMAN

*Attesting Officer*     *Commissioner of Patents and Trademarks*